Jan. 19, 1943.  G. A. LYON  2,308,617
WHEEL STRUCTURE
Filed Nov. 25, 1940
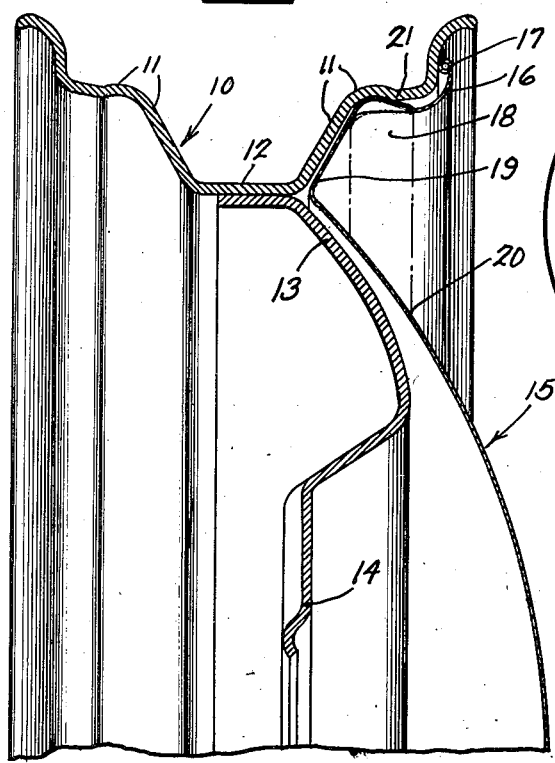
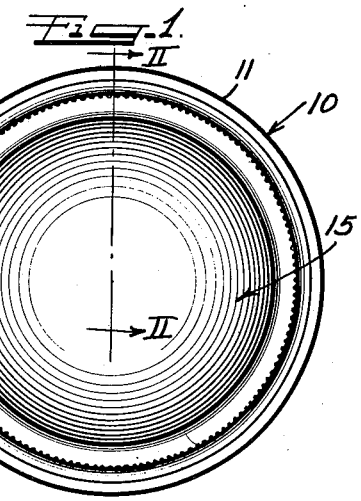
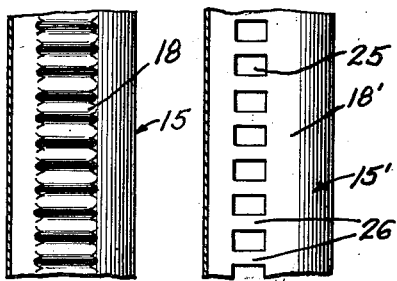
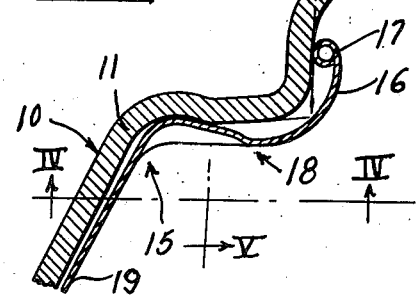
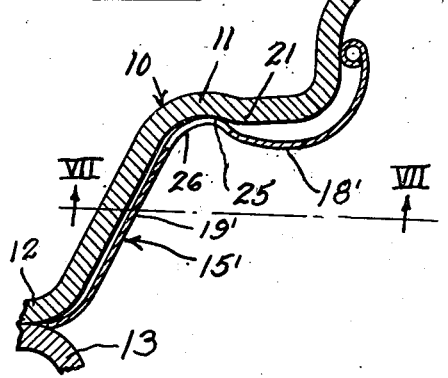
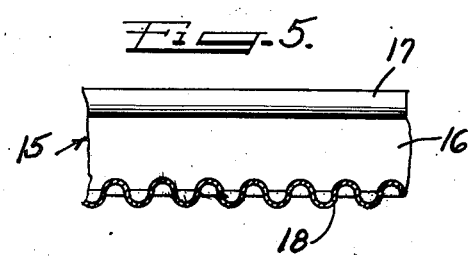
GEORGE ALBERT LYON.

Patented Jan. 19, 1943

2,308,617

UNITED STATES PATENT OFFICE 2,308,617

WHEEL STRUCTURE

George Albert Lyon, Allenhurst, N. J.

Application November 25, 1940, Serial No. 366,975

6 Claims. (Cl. 301—37)

This invention relates to a wheel structure, and more particularly to a simplified means for detachably and resiliently retaining a wheel cover either in the form of a disk or annulus on the outer side of a wheel.

An object of this invention is to provide the cover with a simplified springable means adapted upon pressure of the cover into retained cooperation with the tire rim of the wheel to detachably but firmly retain the cover on the wheel.

Still another object of the invention is to utilize in a wheel cover corrugations for providing the cover with a retaining portion adapted to be sprung upon being wedged or pressed against a shoulder on a part of the wheel.

In accordance with the general features of this invention, there is provided in a wheel structure including a wheel having a flanged and shouldered tire rim a wheel cover comprising a circular member including a corrugated portion constructed to be disposed inside of a shouldered flange of the tire rim and being flexible upon being pressed against the shoulder as the cover member is mounted on the wheel whereby the corrugated portion is sprung into cover retaining engagement with the shoulder.

Another feature of the invention relates to the provision of spaced slots in the flexible retaining portion of the cover member so as to enhance the resiliency of the flexible portion.

Still another feature relates to a bulged portion in a transverse or axial flange of the rim which provides a groove for receiving a tire bead to prevent displacement thereof as well as provides this flange with a radially inwardly extending shoulder for retaining cooperation with a wheel cover.

Other objects and features of this invention will more fully appear from the following detailed description taken in connection with the accompanying drawing which illustrates several embodiments thereof, and in which:

Figure 1 is a side elevation of a wheel structure embodying the features of this invention;

Figure 2 is an enlarged fragmentary cross sectional view taken on the line II—II of Figure 1 looking in the direction indicated by the arrows and showing the manner in which my novel wheel cover is detachably retained on the wheel;

Figure 3 is an enlarged fragmentary sectional view corresponding to the upper right hand portion of Figure 2 and illustrating more clearly the cooperation between the corrugated portion of my cover and the shoulder on the tire rim;

Figure 4 is a fragmentary elevation taken on the line IV—IV of Figure 3 looking upwardly and showing the longitudinal contour of the corrugations;

Figure 5 is a fragmentary cross sectional view taken on the line V—V of Figure 3 looking in the direction indicated by the arrows and showing the cross sectional contour of the corrugations;

Figure 6 is a view similar to Figure 3 illustrating a modification of the invention wherein the flexible portion instead of being corrugated is slotted; and Figure 7 is a fragmentary elevation taken on the line VII—VII of Figure 6 looking upwardly.

As shown on the drawing:

The reference character 10 designates generally a rolled drop center type of tire rim which has a multiple of side flanges 11, as well as a base flange 12, which is connected to a central body part or spider 13. The spider part 13 terminates in the usual wheel bolting flange 14 by means of which the wheel is mounted.

Cooperable with this wheel is a wheel cover 15 embodying the features of this invention. While I have in Figures 1 and 2 illustrated this wheel cover member as being in the form of a solid disk member, it is, of course, to be understood that the features of my invention are equally well applicable to a cover in the form of a ring or annulus such as is shown in the modification of Figure 7. These cover members are made from any suitable sheet material by suitable press equipment, such, for example, as steel sheet. I have obtained excellent results by making the wheel disks or trim rings from stainless steel sheet or from 18–8 steel, and in some instances I have used steel sheet of .020" thickness. In any event, the strip or sheet stock that is used must have sufficient strength and resiliency to carry out the aim and purpose of my present invention.

The wheel cover member 15 includes an outer marginal portion 16 extending alongside of the flanges of the tire rim 10 and terminating in a beaded or turned edge 17. This beaded or turned edge is adapted to reinforce the cover member at the point of the application of a pry-off force in the removal of the cover. In other words, the cover may be removed from the position shown in Figure 2 by inserting the end of a pry-off tool such as a screwdriver under the beaded edge 17 and forcibly prying it loose.

The cover member inwardly of the radial marginal portion 16 is provided with a generally axially extending corrugated portion 18, which terminates in an inclined portion 19 connecting the corrugated portion to a central crown portion 20 of the wheel cover. As shown in Figures 3, 4 and 5, the corrugations extend transversely of the cover, although each of them projects in a radial direction. The outermost extremities of the corrugations of the corrugated portion 18 are disposed in a common circle which is of a diameter greater than the diameter of the inner surface of the shoulder 21 on a flange 11 of the tire rim. As a consequence, in order for the wheel cover to be pressed home into the retained position shown in Figure 2, it is necessary for the corrugated portion to flex as it is passed over the high point of the shoulder 21 and into retaining cooperation with the rear side of the shoulder on the axially extending flange of the tire rim.

By corrugating the axially extending portion 18 of the cover member, I not only provide for increased flexibility for this portion of the cover so that this portion can be easily sprung over the shoulder 21, but in addition thereto I provide a highly ornamented cover member. That is to say, the relation of the corrugated portion 18 opposite the bulged or crown portion 20 enables me to obtain a very pleasing and decorative appearance in the wheel cover member.

In Figures 6 and 7, I have illustrated a modification of the invention wherein the cover member 15' instead of being in the form of a disk is in the form of an annulus and wherein the flexible portion 18' is undercut and slotted as indicated at 25. These slots 25 are not disposed at spaced intervals in the portion 18' leaving spaced ribs 26 for retaining cooperation with the shoulder 21. By thus slotting portion 18' at its junction with portion 19' I find that I can, if it is so desired, increase the resiliency or flexibility of this portion, as well as further enhance the appearance of the cover. These slots or openings can be of such size and arrangements with reference to the flange of the wheel that the colored finish on the tire rim flange may be seen through the slots in contrast to the finish of the cover member itself.

It should be noted that in Figure 2 I have designated the area that is corrugated by dot and dash lines. The reason that I have done this is for the sake of clearness in bringing out the relation of the corrugations to the shoulder on the tire rim. However, in Figure 4, I have shown the longitudinal arrangement of the corrugations, and it will be appreciated from this view that for the sake of clearness it is better to only show the corrugated area in Figure 2 by the dot and dash lines.

In both forms of the invention, the flexible portion in passing over the hump or shoulder 21 is deflected out of its normal circular shape and upon reaching the rear side of the shoulder moves back partly toward its original normal circular shape but not completely to its original shape. As a consequence, when the flexible portion is in engagement with the hump or shoulder 21, it is exerting a spring pressure tending to return it to its original shape, and it is this spring pressure which is utilized in conjunction with the shoulder 21 to retain the cover member on the wheel.

It will also be observed that in all forms of my invention I utilize the rim shoulder in the retaining of the wheel cover on the wheel. This shoulder is formed by bulging an axial flange of the rim and is one of two provided in the rim flanges to prevent slipping or sliding of the tire beads toward the base flange of the rim. Without such shoulders there is a marked tendency of the beads sliding transversely toward the rim base flange when the tire is punctured and thereby occasioning damage to or excessive wear of the tire. Thus these shoulders are employed for a dual function in my novel wheel construction.

I claim as my invention:

1. In a wheel structure including a wheel having a flanged and shouldered tire rim, a wheel cover comprising a circular member including a transversely corrugated portion constructed to be disposed inside a shouldered flange of the tire rim, the outer extremities of the corrugations being disposed in a common circle having a diameter greater than that of the inner surface of said shoulder, said portion being flexible upon being pressed against said shoulder as the cover member is mounted on the wheel, whereby the corrugated portion is sprung into cover retaining engagement with said shoulder.

2. In a wheel structure including a wheel having a flanged and shouldered tire rim, a wheel cover comprising a circular member including a transversely corrugated portion constructed to be disposed inside a shouldered flange of the tire rim, the outer extremities of the corrugations being disposed in a common circle having a diameter greater than that of the inner surface of said shoulder, said portion being flexible upon being pressed against said shoulder as the cover member is mounted on the wheel, whereby the corrugated portion is sprung into cover retaining engagement with said shoulder, said corrugations facing radially outward and being disposed in intermediate portion of the cover as well as opposite an intermediate flange of the rim.

3. In a wheel structure including a wheel having a flanged and shouldered tire rim, a wheel cover comprising a circular member including a transversely corrugated portion constructed to be disposed inside a shouldered flange of the tire rim, the outer extremities of the corrugations being disposed in a common circle having a diameter greater than that of the inner surface of said shoulder, said portion being flexible upon being pressed against said shoulder as the cover member is mounted on the wheel, whereby the corrugated portion is sprung into cover retaining engagement with said shoulder, the corrugated portion extending generally in an axial direction with said corrugations projecting radially therefrom and said shoulder on the tire rim projecting radially inwardly to an extent requiring flexure of said corrugations in order for them to be pushed over and into retaining cooperation with the rear side of the shoulder.

4. In combination, a wheel having a shouldered tire rim and a wheel cover for retaining cooperation with said flanged and shouldered tire rim, said cover comprising a circular member having a continuous annular corrugated portion flexible to be sprung over and into cover retaining engagement with a shoulder on said tire rim, said corrugated portion comprising relatively short axially extending alternate ridges and valleys, the valleys between said corrugations being out of contact with said shoulder so as to enhance the resiliency of alternate retaining ridges of said portion.

5. As an article of manufacture, a wheel cover for retaining cooperation with a flanged and shouldered tire rim, said cover comprising a circular member having a corrugated portion flexible to be sprung over and into cover retaining engagement with a shoulder on said tire rim, said corrugated portion extending generally in an axial direction with said corrugations projecting radially from this portion.

6. In a wheel structure including a wheel having a flanged and shouldered tire rim, a wheel cover comprising a circular member including a transversely corrugated portion constructed to be disposed inside a shouldered flange of the tire rim, the outer extremities of the corrugations being disposed in a common circle having a diameter greater than that of the inner surface of said shoulder, said portion being flexible upon being pressed against said shoulder as the cover member is mounted on the wheel, whereby the corrugated portion is sprung into cover retaining engagement with said shoulder, said shoulder being formed by a radial inner bulge in an intermediate flange of said rim and which bulge also provides a groove inside said rim flange for receiving a tire bead and to prevent displacement of said bead upon puncture of the tire.

GEORGE ALBERT LYON.